United States Patent
Xu

(10) Patent No.: US 11,709,722 B2
(45) Date of Patent: Jul. 25, 2023

(54) EXTENSIBLE COMMUNICATION FRAMEWORK AND COMMUNICATION METHOD SUPPORTING MULTIPLE COMMUNICATION PROTOCOLS

(71) Applicant: SHANGHAI NCATEST TECHNOLOGIES CO., LTD., Shanghai (CN)

(72) Inventor: Dustcool Xu, Shanghai (CN)

(73) Assignee: SHANGHAI NCATEST TECHNOLOGIES CO., LTD, Shanghai (CN)

( * ) Notice: Subject to any disclaimer, the term of this patent is extended or adjusted under 35 U.S.C. 154(b) by 0 days.

(21) Appl. No.: 17/425,970

(22) PCT Filed: Oct. 13, 2020

(86) PCT No.: PCT/CN2020/120635
§ 371 (c)(1),
(2) Date: Jul. 27, 2021

(87) PCT Pub. No.: WO2021/135496
PCT Pub. Date: Jul. 8, 2021

(65) Prior Publication Data
US 2022/0327010 A1   Oct. 13, 2022

(30) Foreign Application Priority Data

Dec. 30, 2019   (CN) .......................... 201911388449.9

(51) Int. Cl.
*G06F 9/54*   (2006.01)
(52) U.S. Cl.
CPC .................... *G06F 9/546* (2013.01)
(58) Field of Classification Search
None
See application file for complete search history.

(56) References Cited

U.S. PATENT DOCUMENTS 6,691,299 B1 *   2/2004   Hart ................. G06F 9/465
                                                     717/108
9,462,089 B1 *  10/2016   Fallows ............. H04L 69/14
(Continued)

FOREIGN PATENT DOCUMENTS

FR          2801704 A1 * 11/1999   ............. G06F 9/546
WO   WO 2004093409 A2 *  4/2004   ............. G06Q 10/08

*Primary Examiner* — Charles E Anya
(74) *Attorney, Agent, or Firm* — Tianchen LLC.; Yuan R. Li; Yi Fan Yin

(57) ABSTRACT

The present invention provides an extensible communication framework supporting multiple communication protocols, for connecting a software platform and a device. The extensible communication framework comprises a communication interface and a communication model, wherein the communication interface comprises a device interface, a channel interface and a protocol interface. The communication model calls the device interface, the channel interface and the protocol interface during communication. When the software platform is connected with the device, a class is created in the device interface, the class is inherited from the device interface; a channel protocol is newly created in the channel interface, the channel protocol is inherited from the channel interface; a sub-protocol interface is created in the protocol interface, the sub-protocol interface is inherited from the protocol interface. The software platform communicates with the device through the communication model, and the class, the channel protocol and the sub-protocol interfaces are called during communication. The present invention makes software code maintenance and function addition become very convenient, and ultimately ensures the product software quality.

3 Claims, 1 Drawing Sheet

(56) References Cited

U.S. PATENT DOCUMENTS

2006/0224748 A1\* 10/2006 Gupta ................. H04L 12/1854
                                                    709/228
2014/0181217 A1\*  6/2014 Jolfaei ................ H04L 65/1066
                                                    709/206

\* cited by examiner

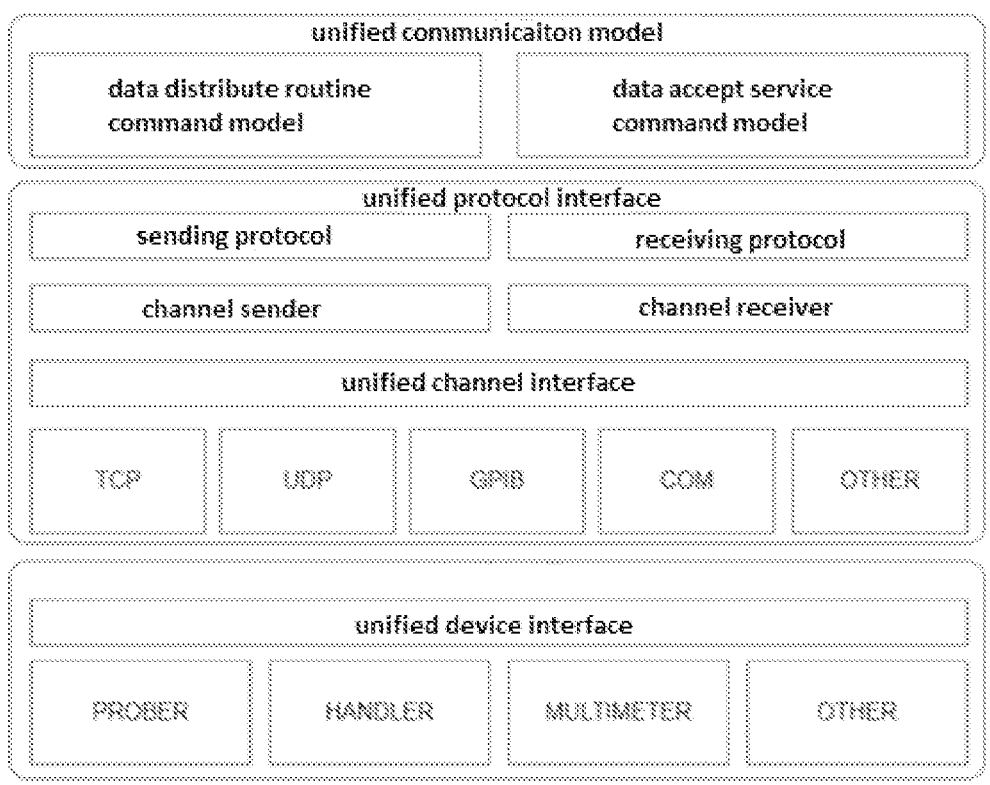

EXTENSIBLE COMMUNICATION FRAMEWORK AND COMMUNICATION METHOD SUPPORTING MULTIPLE COMMUNICATION PROTOCOLS

CROSS-REFERENCE TO RELATED APPLICATION

The present application claims the priority benefit of International Patent Application Serial No. PCT/CN2020/120635, filed Oct. 13, 2020, which is related to and claims priorities to Chinese Patent Application No. 201911388449.9, filed with the Chinese Patent Office on Dec. 30, 2019, which is incorporated in the present application by reference in its entirety.

FIELD OF THE INVENTION

The present invention relates to the field of semiconductor testing, and specifically relates to an extensible communication framework and communication method supporting multiple communication protocols.

BACKGROUND OF THE INVENTION

In the prior art, different communication protocols are developed by using corresponding communication libraries to establish the communication with devices. Each type of the protocols, such as socket (TCP/UDP), GPIB, COM, etc., has its own interface functions definition (including name and parameter) for different development languages (C/C++/JAVA/C#, etc.).

Due to the difference in the protocol itself and the development language, the interface definitions of the related communication libraries are also different (mainly in the function name and parameters). For example, to indicate connection, some interface definition may be called Open, some may be called Connect; to indicate disconnection, some interface definition may be called Close, some may be called Disconnect.

The difference in the interface of the communication library will cause the codes of the business logic layer to face interface function calls with the same function but different names when integrating different protocol developments, which undoubtedly destroys the readability and maintainability of the program. In the industry, different communication protocols can be encapsulated. The encapsulation contains many protocols (including applications in various fields), such as visa. However, such technical solution focuses on the scalable support for different communication protocols, but lacks abstract design for different business models.

In the prior art, when a software platform communicates with a device, the main problem is that the communication protocols for different device are different, which causes the non-unification and non-standardization of the communication process, including the non-unification of the communication interface and the non-standardization of the communication model. Therefore, it is necessary to design a communication framework in which the communication protocol and the communication model can be expanded at the same time.

BRIEF SUMMARY OF THE DISCLOSURE

The purpose of the present invention is to provide an extensible communication framework and communication method that supports multiple communication protocols. When different devices with different communication protocols are introduced, the new communication protocol can be implemented according to the established unified communication interface. The upper-layer business logic code will not be affected, which makes the software code maintenance and function addition extremely convenient, and ultimately ensures the quality of the product software.

In order to achieve the above objectives, the present invention provides an extensible communication framework supporting multiple communication protocols for connecting a software platform and a device. The extensible communication framework includes a communication interface and a communication model, wherein the communication interface includes a device interface, a channel interface and a protocol interface; the communication model calls the device interface, the channel interface and the protocol interface during communication.

When the software platform is connected to the device, a class is created in the device interface, and the class is inherited from the device interface; a channel protocol is created in the channel interface, and the channel protocol is inherited from the channel interface; a new sub-protocol interface is created in the protocol interface, and the sub-protocol interface is inherited from the protocol interface. The software platform and the device communicate through the communication model, and the class, the channel protocol and the sub-protocol interface are called during communication.

Furthermore, the communication model includes a data distribute routine command model and a data accept service command model.

Furthermore, the protocol interface includes an IChannelSender interface for sending data, an ISendAgreement interface for defining the protocol of sending data; an IChannelReceiver interface for data receiving, and an IReceiveAgreement interface for defining the protocol of receiving data.

Furthermore, when the software platform is connected to a device, a Sender interface, a SendAgreement interface, a Receiver interface, and a ReceiveAgreement interface are newly created in the protocol interface.

Furthermore, the device includes at least one channel, and each of the at least one channel corresponds to a channel protocol and a sub-protocol interface in the communication framework.

A device communication method using an extensible communication framework supporting multiple communication protocols includes the following steps:

S01: creating a class in a device interface, the class is inherited from the device interface; connecting a device to a software platform through the class; wherein, the communication framework is used to connect the software platform and the device;

S02: creating a channel protocol in a channel interface, the channel protocol is inherited from the channel interface, and the device is connected to the software platform through the channel protocol;

S03: creating a sub-protocol interface in a protocol interface, the sub-protocol interface is inherited from the protocol interface, and the device implements data sending and receiving through the sub-protocol interface and the software platform;

S04: communicating between the device and the software platform using a communication model, and during communication, calling the class, the channel protocol, and the sub-protocol interface.

Furthermore, the communication model includes a data distribute routine command model and a data accept service command model.

Furthermore, the protocol interface includes an IChannelSender interface for sending data, an ISendAgreement interface for defining the protocol of sending data; an IChannelReceiver interface for data receiving, and an IReceiveAgreement interface for defining the protocol of receiving data. Wherein, step S03 includes creating the IChannelSender interface, the ISendAgreement interface, the IChannelReceiver interface and the IReceiveAgreement interface in the protocol interface.

Furthermore, the data distribute routine command model completes communication through synchronously calling sending and receiving interfaces, and the specific process is as follows:

S011: establishing a connection with the channel protocol of a designated device;

S012: calling the Sender interface to send an instruction message;

S013: calling the Receiver interface synchronously to receive data;

S014: parsing the received data.

Furthermore, the data accept service command model completes the communication through synchronous calling sending and monitoring interfaces, and the specific process is as follows:

S011: establishing a connection with the channel protocol of a designated device;

S012: calling the Sender interface to send an instruction message;

S013: synchronously calling a LISTEN interface of the device to start polling monitoring for data to return until the LISTEN interface is called to stop; wherein, for TCP-based monitoring, a link is firstly monitored, and then data is monitored based on the link; for UDP-based monitoring, data at specified IP and port are directly monitored;

S014: parsing the received data.

The beneficial effects of the present invention are: the present invention uniformly defines the device interface, the channel interface and the protocol interface. When importing different devices with different communication protocols, the new communication protocol can be implemented according to the established unified communication interface, without affecting the upper-layer business logic code, which makes software code maintenance and function addition extremely convenient, and ultimately ensures the product software quality.

BRIEF DESCRIPTION OF THE DRAWINGS

FIG. 1 is a schematic diagram of an extensible communication framework supporting multiple communication protocols of the present invention.

DETAILED DESCRIPTION OF THE EMBODIMENTS

In order to make the content of the present invention clearer and easier to understand, the contents of the present invention will be further described below in combination with the drawings.

As shown in FIG. 1, the present invention provides an extensible communication framework supporting multiple communication protocols for connecting a software platform and a device. The extensible communication framework includes a uniformly defined communication interface and a uniformly defined communication model. The communication interface includes a device interface, a channel interface and a protocol interface. The communication model calls the device interface, the channel interface and the protocol interface during communication.

The core of the present invention lies in the unified definition of the communication interface, which specifically includes a device interface, a channel interface, and a protocol interface. By defining a standard communication interface, different devices and protocols can be encapsulated. The present invention solves the problem to avoid inconsistent interface definitions in the implementation of various communication protocols (including TCP/UDP/GPIB/COM, etc.) in various languages (C/C++/C#/JAVA, etc.) due to that the various communication protocols of the different devices are different, which benefits the standardized control of the product software development.

When the device is connected to the software platform through the communication framework, the device class is uniformly inherited from the device interface, that is, the ICommunicationDevice interface as shown in FIG. 1; the communication channel class of the device is uniformly inherited from the channel interface, that is, the ICommunicatingChannel interface as shown in FIG. 1. A device may contain multiple channels, and the device class creates a communicable channel by calling a Connect interface.

Specifically, the device interface, that is, the ICommunicationDevice interface, defines the attributes and behaviors of the device. The attributes include ID, Name, communication mode (TCP/UDP/GPIB/COM, etc.), communication status (Interrupt, Error, Communicating), type (virtual device, physical device), device specification information (manufacturer, model, barcode, etc.). The behaviors include Connect, Send, Receive and Executive (Send+Receive).

The channel interface, that is, the ICommunicatingChannel interface, defines the attributes and behavior of the communication channel. The attributes include channel name, communication mode (TCP/UDP/GPIB/COM, etc.), communication target (such as IP: Port), send buffer size, receive buffer size, slot, group (used to distinct different channel types) and their equipment. The behaviors include SetOption and Connect.

The Protocol interface includes an IChannelSender interface for sending data; an ISendAgreement interface for defining the protocol of sending data, such as the command of sending data, the block mechanism of sending data, the sending timeout mechanism; an IChannelReceiver interface for data receiving; and an IReceiveAgreement interface for defining the protocol of receiving data, mainly for data analysis.

When the software platform is connected to the device, a new class is created in the device interface, and the class is inherited from the device interface; a channel protocol is created in the channel interface, and the channel protocol is inherited from the channel interface; a sub-protocol interface is created in the protocol interface, and the sub-protocol interface is inherited from the protocol interface. When the software platform is connected to the device, a Sender interface (inherited from the IChannelSender interface), an SendAgreement interface (inherited from the ISendAgreement interface), a Receiver interface (inherited from the IChannelReceiver interface) and a ReceiveAgreement interface (inherited from the IReceiveAgreement interface) are created in the protocol interface. The software platform and the device communicate through the communication model, and the class, the channel protocol and the sub-protocol interface are called during the communication process.

The core of the present invention also lies in the unified definition of the communication model, which distinguishes between a Routine type and a Service type. The former is designed for communication requirements of one-time transaction, and the key point is to emphasize the synchronization of sending and receiving. The latter is designed for communication requirements of service communication, and the key point is to emphasize the asynchronous sending and receiving. The communication model is based on the communication interface and is inherited from a communication scheme according to the actual business requirements, that is, the following two Command classes are inherited from the base class, and there is no need to concern the data sending and receiving process in the sub-class created by the user. The communication model in the present invention includes a data distribute routine command model DistributeRoutineCommand and a data accept service command model AcceptServiceCommand.

The data distribute routine command model DistributeRoutineCommand completes the communication by sending and receiving synchronously. The specific process is as follows:

S011: establishing a connection with a channel protocol of a designated device;

S012: calling the Sender interface to send the instruction message;

S013: calling the Receiver interface synchronously to receive data;

S014: parsing the received data.

The data accept service command model AcceptServiceCommand completes the communication through synchronous calling sending and monitoring. The specific process is as follows:

S011: establish a connection with a channel protocol of a designated device;

S012: calling the Sender interface to send the instruction message;

S013: synchronously calling a LISTEN interface of the device to start polling monitoring for data to return until the LISTEN interface is called to stop. Wherein, for TCP (Transmission Control Protocol)-based monitoring, a link is monitored first, and then the data is monitored based on the link; for UDP (User Datagram Protocol, user datagram protocol)-based monitoring, data at the specified IP and port is directed monitored; wherein, the Listen interface is a service (AcceptServiceCommand) interface.

S014: parsing the received data.

The communication model is uniformly defined. The business requirements of the product software are developed around the two communication models in the above solutions. Although the communication instructions and communication data will change, the processing logic of the communication layer is always among one of the two communication models, which makes the upper business logic function be developed without concerning the process logic of the communication layer, and makes the code level clear. Therefore, the development efficiency is improved and the implementing of the product software instructions is guaranteed.

The device communication method using an extensible communication framework supporting multiple communication protocols provided by the present invention includes the following steps:

S01: when introducing a new type of communication device, creating a new class (such as DeviceA) in the device interface, which is inherited from the device interface; connecting the device to the software platform through the class; implementing the ICommunicationDevice interface and the Connect interface, according to the connection way and connection process of different devices are different;

S02: creating a channel protocol (such as ChannelA) for communicating with the device, creating a new channel protocol in the channel interface, the channel protocol is inherited from the channel interface; implementing the Connect interface, according to the connection way and connection process of different protocols are different;

S03: creating a new sub-protocol interface in the protocol interface, the sub-protocol interface is inherited from the protocol interface, and implementing data sending and receiving between the device and the software platform through the sub-protocol interface.

Specifically, the Sender interface and the SendAgreement interface are created, which are inherited from the IChannelSender interface and the ISendAgreement interface, respectively; the Receiver interface and the ReceiveAgreement interface are created, which are inherited from the IChannelReceiver interface and the IReceiveAgreement interface, respectively.

S04: communicating between the device and the software platform using the communication model, and during communication, calling the class, the channel protocol and the sub-protocol interface.

The communication model in the present invention includes a data distribute routine command model DistributeRoutineCommand and a data accept service command model AcceptServiceCommand.

The data distribute routine command model DistributeRoutineCommand completes the communication by sending and receiving synchronously. The specific process is as follows:

S011: establishing a connection with the channel protocol of a designated device;

S012: calling the Sender interface corresponding to the device to send the instruction message;

S013: calling the receiver interface corresponding to the device synchronously to receive data;

S014: parsing the received data.

The data accept service command model AcceptServiceCommand completes the communication through synchronous call sending and monitoring. The specific process is as follows:

S011: establishing a connection with the channel protocol of a designated device;

S012: calling the Sender interface corresponding to the device to send the instruction message;

S013: synchronously calling a LISTEN interface to start polling monitoring for data to return until the LISTEN interface is called to stop. Wherein, for TCP-based monitoring, a link is monitored first, and then the data is monitored based on the link; for UDP-based monitoring, data at the specified IP and port is directly monitored;

S014: parsing the received data.

The communication model is uniformly defined. The business requirements of the product software are developed around the two communication models in the above solutions. Although the communication instructions and communication data will change, the processing logic of the communication layer is always among one of the two communication models, which makes the upper business logic function be developed without concerning the process logic of the communication layer, and makes the code level clear. Therefore, the development efficiency is improved and the implementing of the product software instructions is guaranteed.

Although the present invention has been described in the above preferred embodiments, the purpose of the embodiments is only to illustrate for the convenience of the description and is not intended to limit the present invention, and those skilled in the art can make some variations and modifications without departing from the spirit and scope of the present invention. The scope of protection claimed by the present invention is determined by the scope of the claims.

The invention claimed is:

1. A communication method using an extensible communication framework supporting multiple communication protocols, the communication method comprising the steps of:
   creating a class in a device interface, the class is inherited from the device interface;
   connecting a device to a software platform through the class;
   wherein the communication framework is used to connect the software platform and the device;
   creating a channel protocol in a channel interface, wherein the channel protocol is inherited from the channel interface, and wherein connecting the device to the software platform through the channel protocol;
   creating a sub-protocol interface in a protocol interface, wherein the sub-protocol interface is inherited from the protocol interface; and wherein the device implementing data sending and receiving with the software platform through the sub-protocol interface; and
   implementing communication between the device and the software platform using a communication model, and calling the class, wherein the channel protocol, and the sub-protocol interface during communication;
   wherein the protocol interface comprises an IChannelSender interface for sending data, an ISendAgreement interface for defining a protocol of sending data, an IChannelReceiver interface for receiving data, and an IReceiveAgreement interface for defining a protocol of receiving data;
   wherein the creating of the sub-protocol interface step includes creating the IChannelSender interface, wherein the ISendAgreement interface, the IChannelReceiver interface and the IReceiveAgreement interface in the protocol interface; and
   wherein the communication model comprises a data accept service command model, which completes the communication through synchronous calling sending and monitoring interfaces to:
      establish a connection with the channel protocol of a designated device;
      call a Sender interface to send an instruction message;
      synchronously call a LISTEN interface of the device to start polling monitoring for data to return until the LISTEN interface is called to stop;
      wherein, for Transmission Control Protocol (TCP)-based monitoring, a link is firstly monitored, and then data is monitored based on the link; and
      wherein for User Datagram Protocol (UDP)-based monitoring, data at specified Internet Protocol (IP) and port are directly monitored, and parsing the received data.

2. The communication method according to claim 1, wherein the communication model further comprises a data distribute routine command model which completes communication through synchronously calling sending and receiving interfaces as follows:
   establishing a connection with the channel protocol of a designated device;
   calling a Sender interface to send an instruction message;
   calling a Receiver interface synchronously to receive data; and
   parsing the received data.

3. The communication method according to claim 1, wherein the device comprises at least one channel, and each of the at least one channel corresponds to a channel protocol and a sub-protocol interface in the communication framework.

* * * * *